United States Patent [19]
Takahashi et al.

[11] 4,406,849
[45] Sep. 27, 1983

[54] METHOD OF AND APPARATUS FOR CONTINUOUSLY MANUFACTURING SLIDE FASTENER COUPLING ELEMENTS

[75] Inventors: Kihei Takahashi, Uozu; Kiyoshi Takeshima, Namerikawa, both of Japan

[73] Assignee: Yoshida Kogyo K. K., Tokyo, Japan

[21] Appl. No.: 291,484

[22] Filed: Aug. 10, 1981

[30] Foreign Application Priority Data

Aug. 19, 1980 [JP] Japan .................................. 55-113647

[51] Int. Cl.³ ............................................. B29D 5/00
[52] U.S. Cl. ................................... 264/167; 264/248; 264/285; 264/295; 264/328.8; 264/339; 425/383; 425/394; 425/814; 425/DIG. 34
[58] Field of Search ............... 264/167, 285, 295, 339, 264/328.8, 248; 425/383, 814, 394, DIG. 34

[56] References Cited
U.S. PATENT DOCUMENTS

| | | | |
|---|---|---|---|
| 2,958,909 | 11/1960 | Bradley et al. | 264/177 R |
| 3,445,915 | 5/1969 | Cuckson et al. | 425/814 |
| 3,886,250 | 5/1975 | Danko | 264/284 |
| 4,025,277 | 5/1977 | Monroe | 425/383 |
| 4,210,985 | 7/1980 | Scott | 24/205.16 R |
| 4,251,912 | 2/1981 | Yoshida | 425/814 |
| 4,257,839 | 3/1981 | Yoshida et al. | 425/814 |
| 4,329,311 | 5/1982 | Moertel | 264/285 |
| 4,333,903 | 6/1982 | Yoshida et al. | 264/285 |
| 4,336,220 | 6/1982 | Takahashi | 425/383 |

*Primary Examiner*—Jeffery R. Thurlow
*Attorney, Agent, or Firm*—Hill, Van Santen, Steadman & Simpson

[57] ABSTRACT

Slide fastener coupling elements are continuously manufactured from a molded strip of coupling element blanks at a speed which is substantially the same as the speed at which the molded strip is produced on a die wheel. The strip of coupling element blanks, as it is withdrawn from the die wheel, is folded about its longitudinal axis into a U-shape while the strip is being heated, and then is heated by hot air before it is shaped into slide fastener coupling elements of a finalized shape as they are heat-set. Then, the coupling elements thus formed are cooled and discharged at a speed equal to the peripheral speed of the die wheel.

14 Claims, 21 Drawing Figures

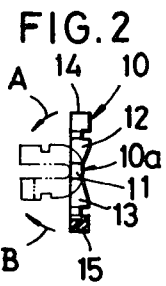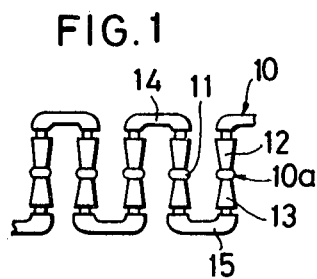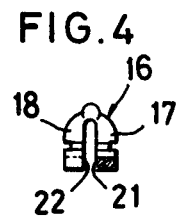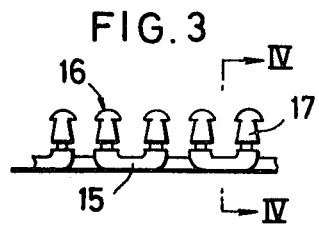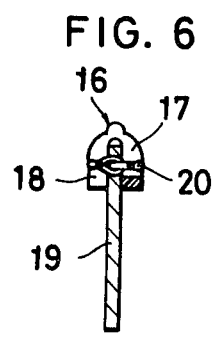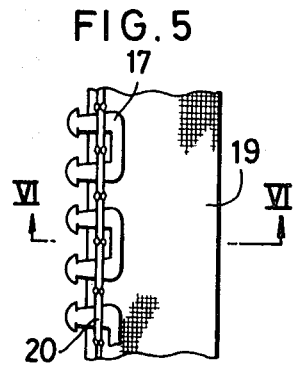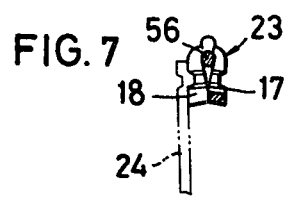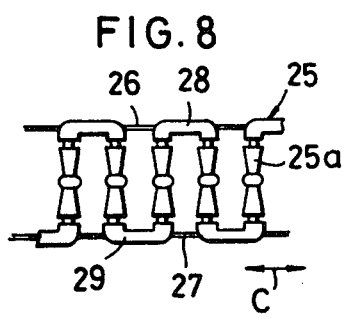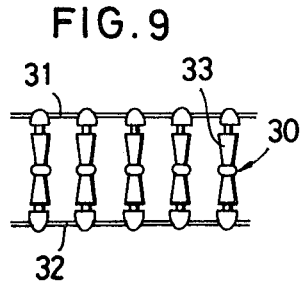

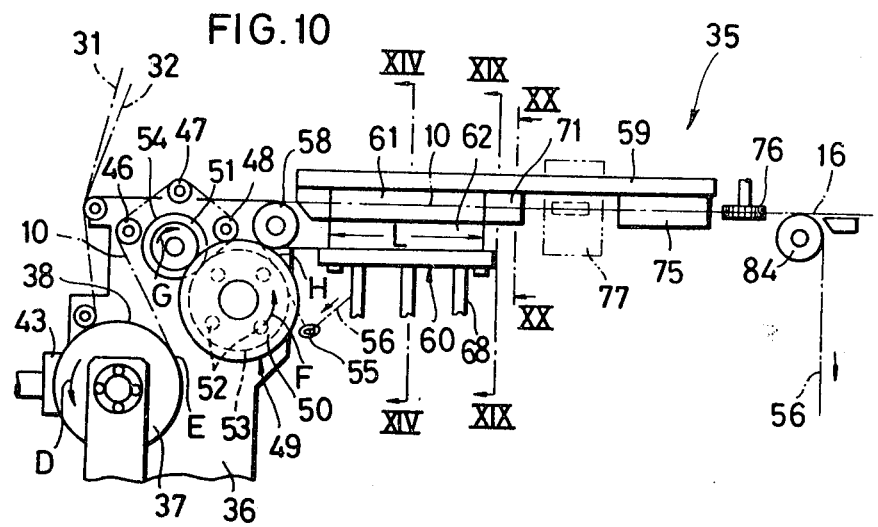

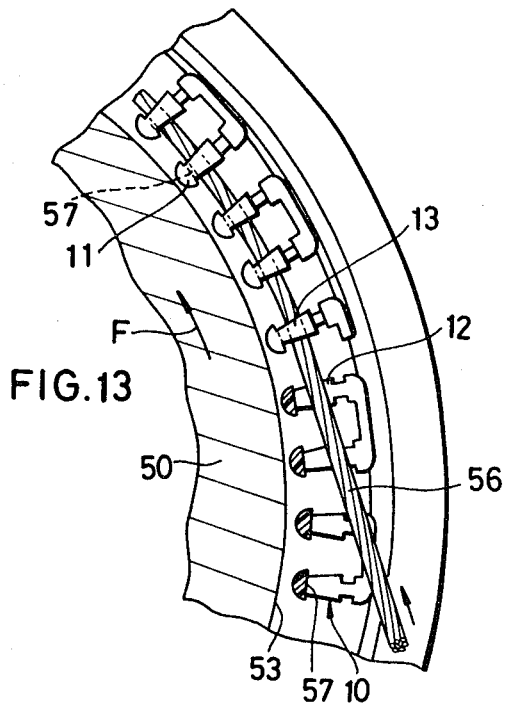
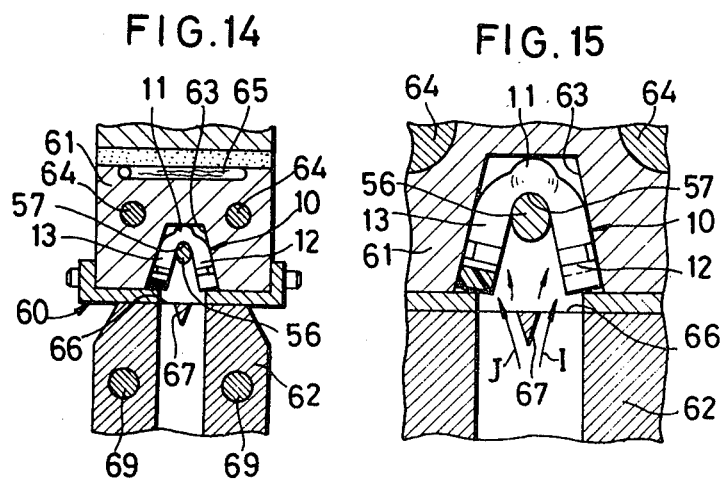

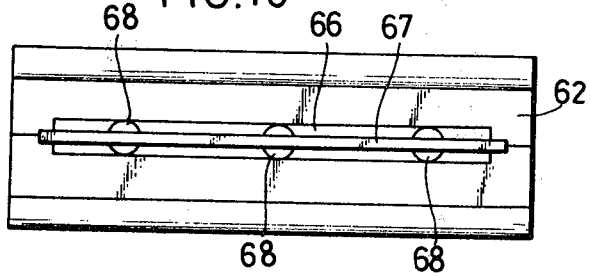
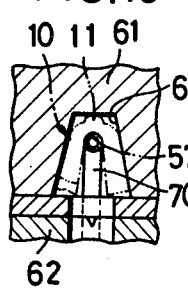
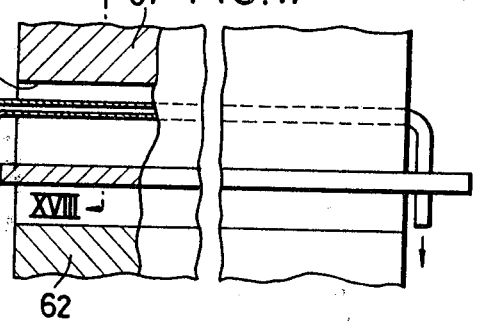
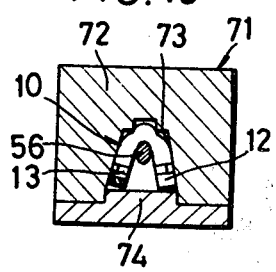
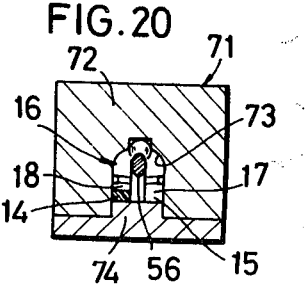
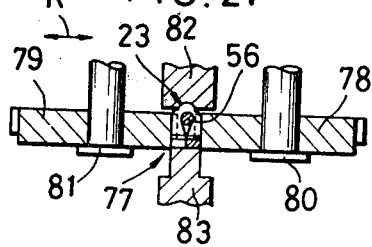

METHOD OF AND APPARATUS FOR CONTINUOUSLY MANUFACTURING SLIDE FASTENER COUPLING ELEMENTS

BACKGROUND OF THE INVENTION

1. Field of the Invention

The present invention relates to a method of and an apparatus for continuously manufacturing molded slide fastener coupling elements of thermoplastic synthetic resin.

2. Prior Art

Continuous molded coupling elements for slide fasteners have found widespread use since they are available in a variety of shapes and colors, have coupling heads of an ideal configuration, render a resultant slide fastener mechanically strong, are relatively light, and can be manufactured at a high rate of production and hence inexpensively. Such molded coupling elements are produced by first molding a strip of coupling element blanks, and then folding the strip of blanks about its longitudinal axis into a U-shape while being heated by high-frequency heating, which may be followed by ultrasonic bonding of legs of formed coupling elements. When these two processing steps are combined together, the overall rate of production of coupling elements becomes reduced since the step of high-frequency heating or ultrasonic bonding takes much more time than the step of molding the strip of coupling element blanks. To cope with this difficulty, it has been proposed to carry out these two steps independently on separate apparatus such as disclosed in U.S. Pat. Nos. 4,025,277 patented May 24, 1977 and 4,210,985 patented July 8, 1980. The former U.S. patent discloses an apparatus for folding and fusing a strip of coupling element blanks, the apparatus including a heater for heating the strip of coupling elements blanks which has been cooled down after being discharged from a molding apparatus as disclosed in the latter U.S. patent. The proposed process is also disadvantageous in that an additional time is required to heat the strip of blanks again for folding and heat-setting or bonding the latter, resulting in a reduction in the rate of manufacture of molded slide fastener coupling elements.

SUMMARY OF THE INVENTION

Thermoplastic synthetic resin is introduced successively into die cavities around a die wheel to mold a strip of coupling element blanks, which is then, while still hot folded about its longitudinal axis into a U-shape by a folder unit located adjacent to the die wheel. The folder unit comprises a rotatable folder die wheel having a peripheral groove and a primary heater, and a rotatable folder disc having a peripheral edge positioned in the peripheral groove to force the strip of coupling element blanks into the peripheral groove. The folded strip of coupling element blanks is then heated by a secondary heater including a guide having a slot for passage of the folded strip of coupling element blanks, and means for heating the folded strip of coupling element blanks while the latter is moving through the slot. The folded strip of coupling elements thus heated is formed into slide fastener coupling elements of a finalized shape by an element-forming die disposed contiguously to the secondary heater and having a slot held in registration with the slot in the secondary heater and progressively constricted to shape the folded strip of blanks continuously into the final form of the slide fastener coupling elements as they are heat-set. The coupling elements thus shaped are then cooled and discharged at a speed which is substantially the same as the speed at which the strip of coupling element blanks is withdrawn from the die wheel. The legs of the formed coupling elements may be bonded together by a bonding unit disposed adjacent to the element forming die, the bonding unit comprising a pair of toothed wheels rotatable in a common plane for jointly forcing therebetween the element legs into contact with each other, and a pair of pressers disposed one on each side of the common plane for holding the coupling elements between the toothed wheel as the coupling elements pass between the toothed wheels. The secondary heater may include a pipe extending through its slot for passage of a coolant therethrough to protect coupling heads of the coupling element blanks against being excessively heated by the heating means.

It is an object of the present invention to provide a method of continuously manufacturing slide fastener coupling elements at a speed which is substantially the same speed at which a strip of coupling element blanks is molded continuously on a die wheel.

Another object of the present invention is to provide an apparatus for reducing such method to practice.

Still another object of the present invention is to provide a method of continuously manufacturing molded slide fastener coupling elements while utilizing in manufacturing steps the heat generated when molding a strip of coupling element blanks.

Still another object of the present invention is to provide a method of continuously manufacturing slide fastener coupling elements from a molded strip of coupling element blanks by additionally heating the latter to facilitate folding thereof and heat-setting of the coupling elements.

Still another object of the present invention is to provide an apparatus for continuously manufacturing slide fastener coupling elements, the apparatus including primary and secondary heaters for heating a molded strip of coupling element blanks to assist in continuously folding the molded strip of blanks about its longitudinal axis and in heat-setting the folded strip of coupling element blanks.

Still another object of the present invention is to provide an apparatus for continuously manufacturing slide fastener coupling elements from a strip of coupling element blanks without causing the latter to be subjected to undue tension while being processed into coupling elements.

Many other advantages, features and additional objects of the present invention will become manifest to those versed in the art upon making reference to the detailed description and the accompanying drawings in which preferred embodiments incorporating the principles of the present invention are shown by way of illustrative example.

BRIEF DESCRIPTION OF THE DRAWINGS

FIG. 1 is a fragmentary plan view of a strip of coupling element blanks;

FIG. 2 is a side elevational view, partly in cross section, of a coupling element blank shown in FIG. 1;

FIG. 3 is a fragmentary plan view of the strip of coupling element blanks of FIG. 1 as it is folded about its longitudinal axis into a coupling element of a U-shaped cross section;

FIG. 4 is a cross-sectional view taken along line IV—IV of FIG. 3;

FIG. 5 is an enlarged plan view of a slide fastener stringer including the coupling element strip of FIG. 3 which is sewn in place to a stringer tape;

FIG. 6 is a cross-sectional view taken along line VI—VI of FIG. 5 the view being turned 90° clockwise on the drawing;

FIG. 7 is a cross-sectional view of another slide fastener stringer;

FIGS. 8 and 9 are fragmentary plan views of different strips of coupling element blanks;

FIG. 10 is a schematic front elevational view of an apparatus in accordance with the present invention;

FIG. 11 is an enlarged fragmentary plan view of a circumferential surface of an extruder die wheel;

FIG. 12 is a fragmentary enlarged cross-sectional view of the die wheel shown in FIG. 11 and an extruder nozzle;

FIG. 13 is a fragmentary cross-sectional view of a folder die wheel;

FIG. 14 is an enlarged fragmentary cross-sectional view taken along line XIV—XIV of FIG. 10;

FIG. 15 is an enlarged cross-sectional view of a portion of the folder die wheel shown in FIG. 14;

FIG. 16 is an enlarged plan view of a hot-air blower nozzle;

FIG. 17 is an enlarged side elevational view, with parts in crosssection, of a modified secondary heater unit;

FIG. 18 is a cross-sectional view taken along line XVIII—XVIII of FIG. 17;

FIG. 19 is an enlarged cross-sectional view taken along line XIX—XIX of FIG. 10;

FIG. 20 is an enlarged cross-sectional view taken along line XX—XX of FIG. 10; and FIG. 21 is an enlarged cross-sectional view of a bonding unit.

DETAILED DESCRIPTION

Molded slide fastener coupling elements of thermoplastic synthetic resin to be produced according to the method and apparatus of the present invention are first described with reference to FIGS. 1 through 9. In FIG. 1, a molded strip of coupling element blanks 10 is shown in a zigzag or meandering form and comprises a plurality of parallel element-forming bars 10a each including a central coupling head 11 and a pair of legs 12,13 extending from the coupling head 11 in opposite directions, the element-forming bars 10a being connected to each other by connecting portions 14,15 integral with the legs 12,13 at their distal ends. As shown in FIG. 2, the strip of coupling element blanks 10 is folded in the directions of the arrows A,B about its longitudinal axis or the coupling heads 11 into a U-shape, and the folded strip of blanks 10 is heat-set to form a train of slide fastener coupling elements 16 as shown in FIGS. 3 and 4. Each of the coupling elements 16 has a pair of parallel legs 17,18 corresponding to the legs 12,13 of the coupling element blank 10. The coupling elements 16 are attached to a slide fastener stringer tape 19 (FIGS. 5 and 6) by sewn threads 20 with the legs 17,18 disposed one on each side of the stringer tape 19. As illustrated in FIG. 7, the coupling elements 23 may have their legs 17,18 bonded to each other at respective confronting surfaces 21,22 (FIG. 4) thereof, and the coupling elements 23 may be sewn to, or woven or knitted into a slide fastener stringer tape 24 in a manner well known in the art.

FIG. 8 shows another molded strip of coupling element blanks 25 which includes a pair of connector threads 26,27 embedded in connecting portions 28,29 at the time of molding the strip of coupling element blanks 25. With the connector threads 26,27, element-forming bars 25a are securely connected to each other, and the strip of coupling element blanks 25 is rendered resistant to forces applied in the directions of the arrow C which tend to stretch the strip of coupling element blanks 25 longitudinally. According to a modification shown in FIG. 9, a molded strip of coupling element blanks 30 comprises a plurality of separate parallel element-forming bars 33 which are interconnected at their ends by a pair of connector threads 31,32. The strips of coupling element blanks 25,30 are also folded into a U-shape and heat-set as slide fastener coupling elements. The connector threads 26,27 and 31,32 may be removed later by dissolving them in a solution, or may be left so that they can be woven or knitted into a slide fastener stringer tape to attach the coupling elements to the stringer tape.

FIG. 10 illustrates an apparatus generally designated at 35 for continuously molding such a strip of coupling element blanks and for forming the strip of blanks into a train of molded coupling elements of a finalized shape. The apparatus 35 comprises a frame 36 on which there is mounted a die wheel 37 for continuous rotation in the direction of the arrow D. The die wheel 37 has on and around its circumferential surface 38 (FIGS. 11 and 12) a plurality of parallel die cavities 40 for molding, for example, element-forming bars 10a and a plurality of alternate die cavities 42 extending between the ends of the die cavities 40 for molding, for example, connecting portions 14,15. A shoe 43 is held against the circumferential surface 28 of the die wheel 37 and has an extruder nozzle 44 (FIG. 12) for introducing molten thermoplastic synthetic resin successively into the die cavities 40 and hence the die cavities 42 as the die wheel 37 rotates. While the die wheel 37 revolves in the direction of the arrow D, the molten thermoplastic is solidified in the die cavities 40,42 to form a molded strip of coupling element blanks 10 which is separated from the die wheel 37 at a point E and fed around a group of guide rolls 46,47,48. The rate of feed of the strip of coupling element blanks 10 is such that the latter will be separated from the die wheel 37 without being subjected to a substantial tension since the strip of blanks 10 as it leaves the die wheel 37 retains heat intensive enough to allow the strip 10 to be easily deformed.

The apparatus 35 also includes a folder unit 49 mounted on the frame 36 adjacent to the die wheel 37 and comprises a folder die wheel 50, mounted on the frame 36 for driven rotation in the direction of the arrow F, the folder die wheel 50 having a primary heater including heater elements 52 and a peripheral groove 53. A folder disc 51 is mounted on the frame 36 for driven rotation in the direction of the arrow G and has a peripheral edge 54 disposed partly in the peripheral groove 53 in the folder die wheel 50. The molded strip of coupling element blanks 10 is introduced between the folder die wheel 50 and the folder disc 51 as they are driven to rotate, whereupon the strip of blanks 10 is forced by the peripheral edge 54 of the holder disc 51 into the peripheral groove 53 in the folder die wheel 50 so as to be folded about its longitudinal axis into a U-shape. The strip of blanks 10 can be folded easily since it is sufficiently pliable due to heat retained in the strip 10 after having been molded and additional heat applied by the primary heater elements 52 in the folder die wheel 50. For effective utilization of the heat retained in the strip of blanks 10, the holder unit 49 should preferably be located as closely to the die wheel 37 as is possible.

The folded strip of coupling element blanks 10 is supplied with a core cord 56 fed through a guide 55 when the strip of blanks 10 is about to leave the folder die wheel 50 at point H, the core cord 56 being made of heat-resistant yarn such as cotton yarn. As best shown in FIG. 13, the core cord 56 is fed tangentially to the folder die wheel 50 where the core cord 56 is inserted between the legs 12,13 against inner surfaces 57 of the heads 11 of the strip of blanks 10.

The folded strip of coupling element blanks 10 as it is discharged from the folder unit 49 travels around a guide roller 58 and enters a secondary heater unit 60 mounted on a horizontal frame extension 59 secured to the frame 36. The secondary heater unit 60, as best shown in FIGS. 14 and 15, comprises a guide 61 having a downwardly opening slot 63 of a trapezoidal cross section and a hot-air blower 62 disposed below the guide 61, the guide 61 and the hot-air blower 62 being coextensive in length as shown in FIG. 10. The guide 61 contains therein a number of heaters 64 and a passage 65 for a coolant such as water. The folded strip of blanks 10 slidably fits in the slot 63 as it travels therethrough with the legs 12,13 directed divergently downwardly. The temperature of the guide 61 is controlled by the heaters 64 and the water passage 65, as to be maintained at a temperature of about 50° C. The hot-air blower 62 has an oblong opening 66 held in registration and communication with the slot 63, and has a stainless-steel bar or mandrel 67 of a triangular cross section extending longitudinally through and centrally of the opening 66 with one flat side of the mandrel 67 facing the slot 63. The hot-air blower 62 is maintained at a temperature of about 150° C. by a number of heaters 69. Hot air at a temperature ranging from 300° to 320° C. is supplied from three pipes 68 located below the hot-air blower 62 through the opening 66 into the slot 63 in the guide 61. The hot air as it flows upwardly through the opening 66 is divided by the downwardly tapered mandrel 67 into two streams I and J (FIG. 15) which impinge mainly on the legs 12,13, respectively, to heat the latter.

The core cord 56 is held against the surfaces 57 of the heads 11 and serves as a shield against the hot air streams to thereby prevent the heads 11 from becoming melted or deformed.

FIGS. 17 and 18 illustrate another embodiment in which a tube 70 extends longitudinally through the slot 63 for allowing a coolant such as water at a temperature of about 50° C. to pass therethrough. The heads 11 of the strip of blanks 10 traveling through the slot 63 ride on a horizontal portion of the tube 70 and hence are prevented from being excessively heated by the hot air blown upwardly into the slot 63.

The legs 12,13 of the folded strip of blanks 10 can be heated to a desired temperature while moving along through the slot 63 by adjusting the temperature of the hot air supplied and/or selecting the length L of the secondary heater unit 60.

An element-forming die 71 is mounted on the frame extension 59 next to or downstream of the secondary heater unit 60. The element-forming die 71 includes, as illustrated in FIG. 19 and 20, an upper block 72 having a slot 73 and a lower block 74 disposed downwardly of the upper block 72 and closing the slot 73. The slot 73 has a progressively constricted cross section such that its contour near the secondary heater unit 60 is substantially the same as that of the slot 63 in the secondary heater unit 60 as shown in FIG. 19, but is substantially U-shaped at a position remote from the secondary heater unit 60 as shown in FIG. 20. Thus, as the folded strip of coupling element blanks 10, rendered sufficiently pliable by being heated by the secondary heater unit 60, passes through the slot 73, the strip of blanks 10 is forced by the progressively constricted contour of the slot 73 to be squeezed into a train of slide fastener coupling elements 16 of a finalized U-shape, with the legs 17,18 thereof extending substantially parallel to each other (FIG. 20). At the same time the connecting portions 14, 15 of the coupling elements 16 are shaped as desired by the lower block 74.

The slide fastener coupling elements 16 thus molded and shaped pass through a cooling unit 75 (FIG. 10) where the coupling elements 16 are cooled, and then are fed out by a discharging unit 76 which is driven as by a torque motor (not shown) such that the coupling elements 16 are discharged at a speed which is substantially the same as the speed at which the strip of coupling element blanks 10 is molded, or the peripheral speed of the die wheel 37. The strip of coupling element blanks 10 as it is processed into the coupling elements 16 is therefore caused to travel at the same rate as that of molding of the strip of blanks 10, with the results that the blank strip 10 will not be subjected to undue tension and hence deformation, and the coupling elements 16 can be manufactured at a high production rate commensurate with the speed at which the strip of coupling element blanks 10 is continuously molded.

A bonding unit 77 (FIG. 10) may be positioned between the element-forming die 71 and the cooling unit 75 for bonding together the legs 17,18 of the coupling elements 23 as illustrated in FIG. 7. The bonding unit 77 (FIG. 21) comprises a pair of horizontal toothed wheels 78,79 rotatable in a common plane on a pair of shafts 80,81, respectively, for forcing the legs 17,18 into contact with each other. When the legs 17,18 are forced in contact with each other, they are bonded together as they are still soft due to the heat applied by the secondary heater unit 60. The coupling elements 23 thus squeezed by the toothed wheels 78,79 are held for positional stabilization therebetween by a pair of upper and lower pressers or rollers 82,83 disposed one on each side of the common plane of rotation of the toothed wheels 78,79. One of the toothed wheels 79 is movable toward and away from the other toothed wheel 78 in the directions of the arrows K in FIG. 21 for adjusting the degree of bonding between the legs 17,18.

The core cord 56 may be removed from the coupling elements 16 by a roller 84 (FIG. 10) and supplied again to the folder die wheel 50, the core cord 56 being endless for such reuse. Where the molded strip of coupling element blanks 25 (FIG. 8) is to be formed into coupling elements, the connector threads 26,27 may be removed by the roller 84. To facilitate removal of the connector threads 26,27, the connector threads 26,27 should preferably be embedded partly in the connecting portions 28,29 so as to be easily detachable.

Where the coupling elements 23 shown in FIG. 7 are to be manufactured, the core cord 56 may remain inserted between the bonded legs 17,18 instead of being removed by the roller 54.

The connecting threads 26,27 and 31,32, are supplied between the die wheel 37 and the shoe 43, as shown in FIG. 10. Inclusion of the connecting threads 26,27 and 31,32 enables the strip of blanks 25,30 to be tensioned longitudinally without being deformed.

When molten thermoplastic synthetic resin is introduced from the extruder nozzle 44 successively into the die cavities 40 around the die wheel 37 to mold a strip of coupling element blanks, the die wheel 37 is heated up to a temperature ranging from about 120° to 130° C. The molded strip of coupling element blanks as it leaves the die wheel 37 retains heat and, before losing such retained heat, is additionally heated by the heaters 52, whereupon the strip of blanks is folded by the folder unit 49 into a U-shape. The folded blank strip is heated again by the secondary heater unit 60 and is shaped into a train of slide fastener coupling elements as they are heat-set. Accordingly, the heat retained by the molded strip of coupling element blanks is utilized effectively for subsequent processing steps of forming coupling elements.

Although various minor modifications may be suggested by those versed in the art, it should be understood that we wish to embody within the scope of the patent warranted hereon, all such embodiments as reasonably and properly come within the scope of out contribution to the art.

What is claimed is:

1. A method of continuously manufacturing molded slide fastener coupling elements, comprising the steps of:
   (a) introducing thermoplastic synthetic resin successively into cavities around a circumferential surface of a die wheel while the latter is rotating, to mold a strip of coupling element blanks;
   (b) removing said strip of coupling element blanks continuously out of said cavities;
   (c) continuously folding said strip of coupling element blanks about its longitudinal axis while still hot into a U-shaped cross-section while being further heated by the folding means to provide semi-finished coupling heads with legs on each side thereof;
   (d) heat-setting and forming the still hot folded coupling element blanks into slide fastener coupling elements of a finalized shape and dimensions, the legs thereof being still further heated, and the strip being continuously fed along; and
   (e) discharging said slide fastener coupling elements continuously at a speed which is substantially the same as the speed at which the strip of coupling element blanks is molded continuously on said die wheel.

2. A method according to claim 1, the legs of said slide fastener coupling elements during said heat-setting being heated with hot air.

3. A method according to claim 1, prior to said heat-setting step, including the step of introducing a cord longitudinally through said folded coupling element blanks so as to be held against said coupling heads between said legs.

4. A method according to claim 3, including the step of removing said cord out of said coupling elements substantially simultaneously with said discharging step.

5. A method according to claim 1, including the step of bonding said still hot legs together subsequently to said heat-setting step.

6. An apparatus for continuously manufacturing slide fastener coupling elements comprising:
   (a) a frame;
   (b) a die wheel mounted on said frame for continuous rotation at a peripheral speed and having on and around a circumferential surface thereof a plurality of die cavities for molding a strip of coupling element blanks having central coupling heads with legs on each side thereof;
   (c) an extruder nozzle mounted on said frame and directed toward said circumferential surface of the die wheel for injecting hot thermoplastic synthetic resin successively into said die cavities;
   (d) a folder unit mounted on said frame for folding said strip of coupling element blanks about its longitudinal axis as the strip is continuously withdrawn from said die wheel, said folder unit including a first heater for adding heat to said strip while it is being folded;
   (e) a second heater unit for further heating said folded strip of coupling element blanks;
   (f) an element-forming die mounted on said frame and mounting said second heater unit for shaping said folded strip of coupling element blanks, heated by said second heater, into slide fastener coupling elements;
   (g) a cooling unit mounted on said frame for cooling said strip of coupling elements; and
   (h) a discharging unit located adjacent to said cooling unit for discharging said strip of coupling elements at a speed which is substantially the same as said peripheral speed of said die wheel.

7. An apparatus according to claim 6, said folder unit comprising a folder die wheel rotatably mounted on said frame and having a peripheral groove, and a folder disc rotatably mounted on said frame and having a peripheral edge positioned in said peripheral groove for continuously forcing said strip of coupling element blanks longitudinally centrally into said peripheral groove.

8. An apparatus according to claim 6, said second heater unit comprising a guide having a slot of a trapezoidal cross section for guiding said folded strip of coupling element blanks to pass therethrough, and means for heating said folded strip of coupling element blanks while the latter is moving through said slot.

9. An apparatus according to claim 8, said element forming die being located contiguously to said guide.

10. An apparatus according to claim 8, said second heater unit further comprising a tube extending along said slot for passage of a cooling medium therethrough to protect said coupling heads of the coupling element blanks against being excessively heated by said heating means.

11. An apparatus according to claim 8, said element-forming die having a slot held in registration with said slot of said second heater and having a cross section which is progressively constricted for shaping said folded strip of coupling element blanks continuously into the slide fastener coupling elements.

12. An apparatus according to claim 8, said heating means comprising a hot-air blower for supplying hot air into said slot in said guide.

13. An apparatus to claim 6, including a bonding unit mounted on said frame adjacent to said element forming die for bonding said legs of the coupling elements as the latter are discharged out of said element-forming die.

14. An apparatus according to claim 13, said bonding unit comprising a pair of toothed wheels rotatable in a common plane for jointly forcing therebetween said legs into contact with each other, and a pair of pressers disposed one on each side of said common plane for holding said coupling elements therebetween as the latter pass between said toothed wheels.

* * * * *